US012040988B2

(12) United States Patent
Vaduvatha et al.

(10) Patent No.: US 12,040,988 B2
(45) Date of Patent: Jul. 16, 2024

(54) ACKNOWLEDGEMENT COALESCING MODULE UTILIZED IN CONTENT ADDRESSABLE MEMORY (CAM) BASED HARDWARE ARCHITECTURE FOR DATA CENTER NETWORKING

(71) Applicant: Google LLC, Mountain View, CA (US)

(72) Inventors: Srinivas Vaduvatha, San Jose, CA (US); Weihuang Wang, Los Gatos, CA (US); Jiazhen Zheng, Santa Clara, CA (US); Prashant Chandra, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/552,767

(22) Filed: Dec. 16, 2021

(65) Prior Publication Data
US 2022/0385587 A1    Dec. 1, 2022

Related U.S. Application Data

(60) Provisional application No. 63/192,646, filed on May 25, 2021.

(51) Int. Cl.
*H04L 47/34* (2022.01)
*H04L 67/1097* (2022.01)

(52) U.S. Cl.
CPC .......... *H04L 47/34* (2013.01); *H04L 67/1097* (2013.01)

(58) Field of Classification Search
CPC ............................. H04L 47/34; H04L 67/1097
See application file for complete search history.

(56) References Cited

U.S. PATENT DOCUMENTS 6,324,087 B1    11/2001   Pereira
6,473,846 B1    10/2002   Melchior
(Continued)

FOREIGN PATENT DOCUMENTS

CN    108512782 A    *    9/2018
CN    110291743 A    *    9/2019    ........... H04L 1/0043
(Continued)

OTHER PUBLICATIONS

Extended European Search Report for European Patent Application No. 21155513.1 dated Jul. 30, 2021. 9 pages.
(Continued)

*Primary Examiner* — Shean Tokuta
(74) *Attorney, Agent, or Firm* — Lerner David LLP

(57) ABSTRACT

A communication protocol system is provided for reliable transport of packets. A content addressable memory hardware architecture including an acknowledgment coalescing module in communication with a content addressable memory (CAM). The acknowledgment coalescing module coalesces multiple acknowledgement packets as a single acknowledgement packet to reduce the overall numbers of the packet transmission in the communication protocol system. In addition, the acknowledgment coalescing module may also provide a piggyback mechanism to carry acknowledge information in a regular data packet. Thus, the need to generate a new acknowledgement packet may be eliminated. Accordingly, the network congestion and latency may be reduced, and the communication and transmission efficiency are enhanced.

20 Claims, 11 Drawing Sheets

(56) References Cited

U.S. PATENT DOCUMENTS

| | | | |
|---|---|---|---|
| 6,781,990 B1 * | 8/2004 | Puri | H04L 45/54 370/392 |
| 7,058,757 B1 | 6/2006 | Branth et al. | |
| 7,193,876 B1 | 3/2007 | Park et al. | |
| 7,219,188 B1 | 5/2007 | Pereira | |
| 7,240,041 B2 | 7/2007 | Martin et al. | |
| 7,305,486 B2 * | 12/2007 | Ghose | H04L 47/18 370/235 |
| 7,516,487 B1 * | 4/2009 | Szeto | H04L 63/0263 726/13 |
| 7,571,278 B2 | 8/2009 | Anthony, Jr. et al. | |
| 7,688,838 B1 | 3/2010 | Aloni et al. | |
| 7,817,634 B2 | 10/2010 | Coffman et al. | |
| 7,822,916 B1 | 10/2010 | Wen | |
| 7,870,217 B2 | 1/2011 | Pandya | |
| 8,311,059 B2 * | 11/2012 | Williams | H04L 49/9063 370/469 |
| 8,477,760 B2 * | 7/2013 | Lee | H04L 65/765 370/473 |
| 8,549,170 B2 | 10/2013 | Minami et al. | |
| 8,610,086 B2 | 12/2013 | Wolleschensky et al. | |
| 9,817,786 B1 * | 11/2017 | Khan | G11C 15/00 |
| 11,283,719 B2 * | 3/2022 | Wang | H04L 47/34 |
| 2004/0030770 A1 | 2/2004 | Pandya | |
| 2004/0049612 A1 | 3/2004 | Boyd et al. | |
| 2004/0165588 A1 | 8/2004 | Pandya | |
| 2006/0274787 A1 | 12/2006 | Pong | |
| 2007/0064737 A1 * | 3/2007 | Williams | H04L 49/9094 370/473 |
| 2007/0110055 A1 | 5/2007 | Fischer et al. | |
| 2008/0313364 A1 | 12/2008 | Flynn et al. | |
| 2010/0299668 A1 * | 11/2010 | Venkumahanti | G06F 11/3632 718/102 |
| 2011/0273563 A1 * | 11/2011 | Murphy | H04N 7/18 348/143 |
| 2012/0023304 A1 * | 1/2012 | Chan | H04L 47/29 711/170 |
| 2013/0124707 A1 * | 5/2013 | Ananthapadmanabha | H04L 45/00 709/223 |
| 2014/0201318 A1 | 7/2014 | Dajani et al. | |
| 2015/0074322 A1 * | 3/2015 | Galles | G06F 13/4022 710/313 |
| 2017/0187598 A1 | 6/2017 | Andreyev et al. | |
| 2018/0102975 A1 | 4/2018 | Rankin | |
| 2018/0123765 A1 * | 5/2018 | Cao | H04L 1/1819 |
| 2018/0139773 A1 * | 5/2018 | Ma | H04L 27/26025 |
| 2018/0139774 A1 * | 5/2018 | Ma | H04L 1/189 |
| 2019/0190542 A1 | 6/2019 | Wang et al. | |
| 2019/0377580 A1 * | 12/2019 | Vorbach | G06F 9/3802 |
| 2020/0314030 A1 | 10/2020 | Goel et al. | |
| 2020/0403919 A1 * | 12/2020 | Cui | H04L 47/196 |
| 2021/0089450 A1 | 3/2021 | Simionescu et al. | |
| 2021/0119930 A1 * | 4/2021 | Debbage | H04L 1/1642 |
| 2022/0014468 A1 * | 1/2022 | Wang | H04L 47/34 |
| 2022/0085916 A1 * | 3/2022 | Debbage | H04L 1/1635 |
| 2022/0294712 A1 * | 9/2022 | Rangarajan | H04L 69/22 |
| 2022/0385587 A1 * | 12/2022 | Vaduvatha | H04L 1/1832 |

FOREIGN PATENT DOCUMENTS

| | | | | |
|---|---|---|---|---|
| CN | 113711548 A | * | 11/2021 | G06F 13/4265 |
| EP | 3742307 A1 | * | 11/2020 | H04L 45/742 |
| EP | 4096195 A1 | * | 11/2022 | H04L 1/1614 |
| JP | 4723102 B2 | * | 7/2011 | H04L 69/326 |
| JP | 2018164141 A | * | 10/2018 | |
| JP | 2019510446 A | * | 4/2019 | |
| WO | WO-2011134527 A1 | * | 11/2011 | H04L 65/605 |
| WO | WO-2020236302 A1 | * | 11/2020 | G06F 13/4265 |
| WO | WO-2021240215 A1 | * | 12/2021 | |

OTHER PUBLICATIONS

Montazeri, Behnam et al. "Homa: A Receiver-Driven Low-Latency Transport Protocol Using Network Priorities." SIGCOMM '18, Aug. 20-25, 2018, Budapest, Hungary. pp. 221-235.

Rajiullah, Mohammad. "Towards a Low Latency Internet: Understanding and Solutions." Sep. 2015. Dissertation. Department of Computer Science, Karlstad University, Sweden. 58 pages.

Vernersson, Andreas. "Analysis of UDP-based Reliable Transport using Network Emulation." 2015. Master's Thesis. Master of Science in Engineering Technology Computer Science and Engineering. Luleå University of Technology. 93 pages.

Wu, Haitao et al. "ICTCP: Incast Congestion Control for TCP in Data-Center Networks." IEEE/ACM Transactions on Networking, vol. 21, No. 2, Apr. 2013. pp. 345-358.

Extended European Search Report for European Patent Application No. 22157950.1 dated Aug. 10, 2022. 8 pages.

* cited by examiner

ACKNOWLEDGEMENT COALESCING MODULE UTILIZED IN CONTENT ADDRESSABLE MEMORY (CAM) BASED HARDWARE ARCHITECTURE FOR DATA CENTER NETWORKING

CROSS-REFERENCE TO RELATED APPLICATIONS

The present application claims the benefit of the filing date of U.S. Provisional Patent Application No. 63/192,646, filed May 25, 2021, the disclosure of which is hereby incorporated herein by reference.

BACKGROUND

The internet protocol suite is a set of communication protocols used for servicing data transmissions between two devices communicating information over a network. A packet is one form of data in which encapsulated data can be transmitted through networks based on control information that is stored in a head portion, such as a header, of the packet. Generally, if sequence numbers of the packets monotonically increase, it indicates the data flows through the network without loss. After the packets transmitted from the sending computing device is received by the receiving computing device, an acknowledgement packet is sent by the receiving computing device back to the sending computing device, providing an indication that the data packets with the designated sequence numbers have been successfully received.

However, when a series of data packets is transmitted from a sending computing device to a receiving computing device, a corresponding series of acknowledgement packets is generated by the receiving computing device to acknowledge each data packet as received. Overly large amounts of connection and transmission between the sending computing device and the receiving device also result in transmission congestion, which undesirably slows down the data transmission speed as well as increasing the likelihood of data loss or data out of order. In some situations, the data packets may not be received by the receiving computing device within a timeout period, such as a data packet transmission loss. A retransmission may be needed, which may further deteriorate transmission efficiency and performance.

BRIEF SUMMARY

The present disclosure provides a communication protocol system for reliable transport of packets. A content addressable memory (CAM) based acknowledgement (ACK) coalescing hardware architecture may be utilized for the reliable and efficient transport of the ACK packets in response to received data packets. In this regard, a computing system includes a content addressable memory, a data storage with coalesced ACK information, an acknowledgment coalescing module configured to be in communication with the CAM and the ACK information, and one or more processors in communication with the content addressable memory module and the acknowledgment coalescing module. By coalescing the ACKs, fewer ACK packets will present on the network traffic, which may reduce the likelihood of congestion. The usage of CAM can help reduce the total number of storage needed when there is a large number of connections.

In one example, the one or more processors are configured to receive one or more data packets, generate one or more acknowledgement packets in response to receiving the one or more data packets and perform a lookup operation to access data entries stored in the content addressable memory. When ACK coalescing is disabled, one ACK packet may be sent out directly for each received data packet. In contrast, when ACK coalescing is enabled, the ACK coalescing module may perform a CAM lookup operation with the connection ID as the key to find the address of the ACK info data storage for the same connection, so that access existing ACK info entries data entries stored in the data storage content addressable memory may be accessed. When a match is found between the accessed data entries and the generated one or more acknowledgement packets, the one or more processors are configured to coalesce the one or more acknowledgement packets in the acknowledgment coalescing module. For example, when a match is found between a connection ID of accessed ACK information data entries and the connection ID of the generated one or more acknowledgement packets, new ACK packets will be coalesced into existing ACK information. When the ACK count reaches a pre-programmed threshold after coalescing the new ACK packet, a single coalesced ACK packet may be sent out and covering the ACK information for current connection. In the meantime, the corresponding CAM entry may be uninstalled. If threshold is not reached, the coalesced ACK information may be stored into the current data storage entry. If the ACK is the first one to be coalesced for its connection, the coalesced ACK information will be stored into the next data storage entry and CAM may be updated with the new data storage address.

In one example, when a match is not found between the accessed data entries and the generated one or more acknowledgement packets, the one or more processors are configured to install a new data entry in the content addressable memory and/or data storage. The one or more processors are configured to evict the coalesced acknowledgement packets as a single acknowledgment packet when a pre-programmed threshold of acknowledgement packet count is reached. The one or more processors are configured to piggyback an acknowledgment message in the one or more acknowledgment packets.

In one example, the one or more processors are configured to uninstall the data entries in the content addressable memories after the coalesced acknowledgement packets are evicted. The one or more processors are configured to evict the one or more acknowledgement packets immediately when the occupancy of data storage reaches a pre-programmed threshold. The one or more processors are configured to perform a background scan in the acknowledgment coalescing module and evict the one or more acknowledgement packets when a pre-programed threshold of acknowledgement coalescing time is reached. The lookup operation further includes looking up a connection ID as the key of the CAM related to the one or more acknowledgement packet. The one or more acknowledgement packets comprises information of base sequence number (BSN) and sequence number bitmap (SNB).

In one example, in the embodiment wherein an ACK information entry doesn't reach the count threshold and sits in the data storage for a long time, there is a time-based eviction mechanism. The address of ACK information data storage for each connection is assigned based on the time they arrive at the ACK coalescing module. Since the address is incremental, the address with lower number may indicate such data entries are older. Therefore, the oldest entry may always be tracked. By checking if the oldest entry exceeds the pre-programmed time threshold, the ACK coalescing module may determine whether the ACK information is to be sent out. If the current ACK is sent out, ACK coalescing may check the next oldest entry. Alternatively, ACK coalescing may keep checking the current oldest entry until the time threshold is met.

The present disclosure provides a method. The method includes receiving, by one or more processors, one or more data packets in a computing system, generating, by the one or more processors, one or more acknowledgement packet in response to the one or more data packets and performing, by the one or more processors, a CAM lookup operation to obtain data storage address to access data entries stored in the data storage in the computing system. In one example, when a match is found between the accessed data entries and the generated one or more acknowledgement packets, the one or more processors is configured to coalesce the one or more acknowledgement packets in an acknowledgment coalescing module.

In one example, the method further includes installing, by one or more processors, a new data entry in the content addressable memory when a match is not found between the accessed data entries and the generated one or more acknowledgement packets. The method also includes evicting, by one or more processors, the coalesced acknowledgement packets as a single acknowledgment packet when a pre-programmed threshold of acknowledgement packet count is reached. The evicting of the coalesced acknowledgement packets as the single acknowledgment packet further includes piggybacking, by the one or more processors, an acknowledgment message in the one or more acknowledgment packets.

In one example, the method further includes evicting, by then one or more processors, the one or more acknowledgement packets immediately when the one or more data packets includes an acknowledgment requested mark set therein. The method further includes uninstalling, by the one or more processors, the data entries in the content addressable memories after the coalesced acknowledgement packets are evicted. The method further includes performing a background scan, by the one or more processors, in the acknowledgment coalescing module, and evicting, by the one or more processors, the one or more acknowledgement packets when a pre-programed threshold of acknowledgement coalescing time is reached.

In one example, the lookup operation further includes looking up, by the one or more processors, a connection ID or packet sequence number in the data entries in the CAM related to the one or more acknowledgement packet. The one or more acknowledgement packets includes information of base sequence number (BSN) and sequence number bitmap (SNB). The computing system is configured to perform a Remote Direct Memory Access (RDMA) operation.

The present disclosure provides a method. The method includes coalescing, by one or more processors, multiple acknowledgement packets to generate a single coalesced acknowledgement packet in a coalescing acknowledgment module implemented in a computing system and evicting the single coalesced acknowledgement packet to an initiator entity in the computing system.

DETAILED DESCRIPTION

The technology generally relates to communication protocols for reliable transport (RT) of packets over a connection. A content addressable memory (CAM) based hardware architecture including an acknowledgement coalescing module in communication with a CAM is utilized in the communication protocols for reliable data packet transmission. The acknowledgement coalescing module may coalesce multiple acknowledge packets into a single acknowledgement (ACK) packet for a large number of connections. By doing so, the data transmission performance and speed may be enhanced by reducing a total number of the acknowledge packet transmission/overhead for reliable transmission. In one example, the acknowledgement coalescing module may be in communication with a CAM implemented in the computing system to cooperatively record and determine the numbers and criteria of ACK packets to be coalesced and piggybacked so as to provide an efficient and reliable transmission.

Figure 1:
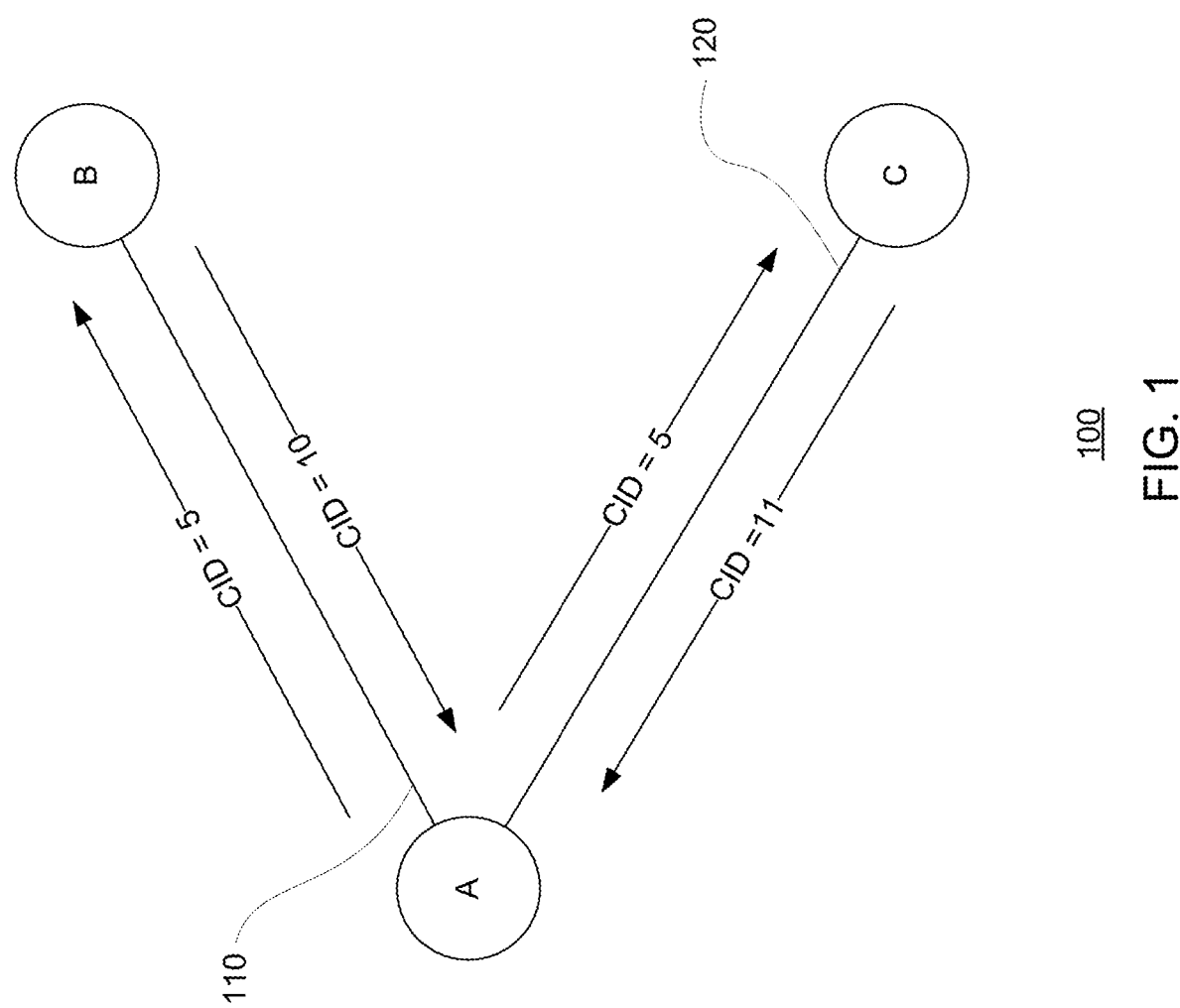
FIG. 1 is a schematic diagram of a network according to aspects of the disclosure.

FIG. 1 shows an example network 100. The network 100 includes various entities, such as entity A, entity B, and entity C. In order to communicate with one another, connections are formed between the entities, such as connection 110 between entities A and B, and connection 120 between entities A and C. The entities may communicate over the connections using one or more protocols. For example, a reliable transport (RT) protocol is a protocol which notifies the sender whether or not the delivery of data to an intended receiver was successful. A sender and a receiver are considered peers of a communication protocol, thus entities A and B may be reliable transport peers, and entities A and C may be reliable transport peers. A connection over which reliable transport protocol is used is an end-to-end construct that describes a bidirectional communication channel between two reliable transport peers.

A connection may be identified by a pair of Connection IDs ("CIDs"), one in each direction of communication. CIDs may be allocated by a receiver entity during connection setup process and have no global significance outside of the parties involved. In the example shown, the connection 110 between entities A and B has a CID with value 5 for the direction from A to B, and a CID with value 10 for the direction from B to A. The connection 120 between entities A and C has a CID value 5 for the direction from A to C and a CID with value 11 for the direction from C to A. In other examples, CIDs may be assigned by a source entity. Such "Source CIDs" may have different values assigned to different receiver entities. Thus, in the example shown, the CIDs or Source CIDs assigned by entity A between the connection of entity A and B have different values 10 and 11. In contrast, "Destination CIDs" of an entity are assigned by other entities and may have the same value. Thus, in the example shown, the Destination CIDs of entity A are assigned by entities B and C respectively, which may have the same value 5.

Packets may be transmitted over the connections between the entities. In this regard, a packet is a basic unit of communication across a connection. A packet may have a predetermined size, for example up to a maximum transfer unit ("MTU") in length. A packet may have a header including information about the packet and its transmission, and a payload of data. To ensure reliable transport, a reliable transport packet may include the Destination CID, such as in a header. For example, when entity B receives a packet over the connection 110 with the Destination CID of 5, entity B may identify the packet as coming from entity A and may then notify A that the packet has been received by sending an acknowledgment over the connection 110 referencing this packet and its CID of 5. The acknowledgment itself may be sent as a packet including the Destination CID of 5. Entities A, B, and C may be any type of device capable of communicating over a network, such as personal computing devices, server computing devices, mobile devices, wearable devices, virtual machines, etc.

Figure 2:
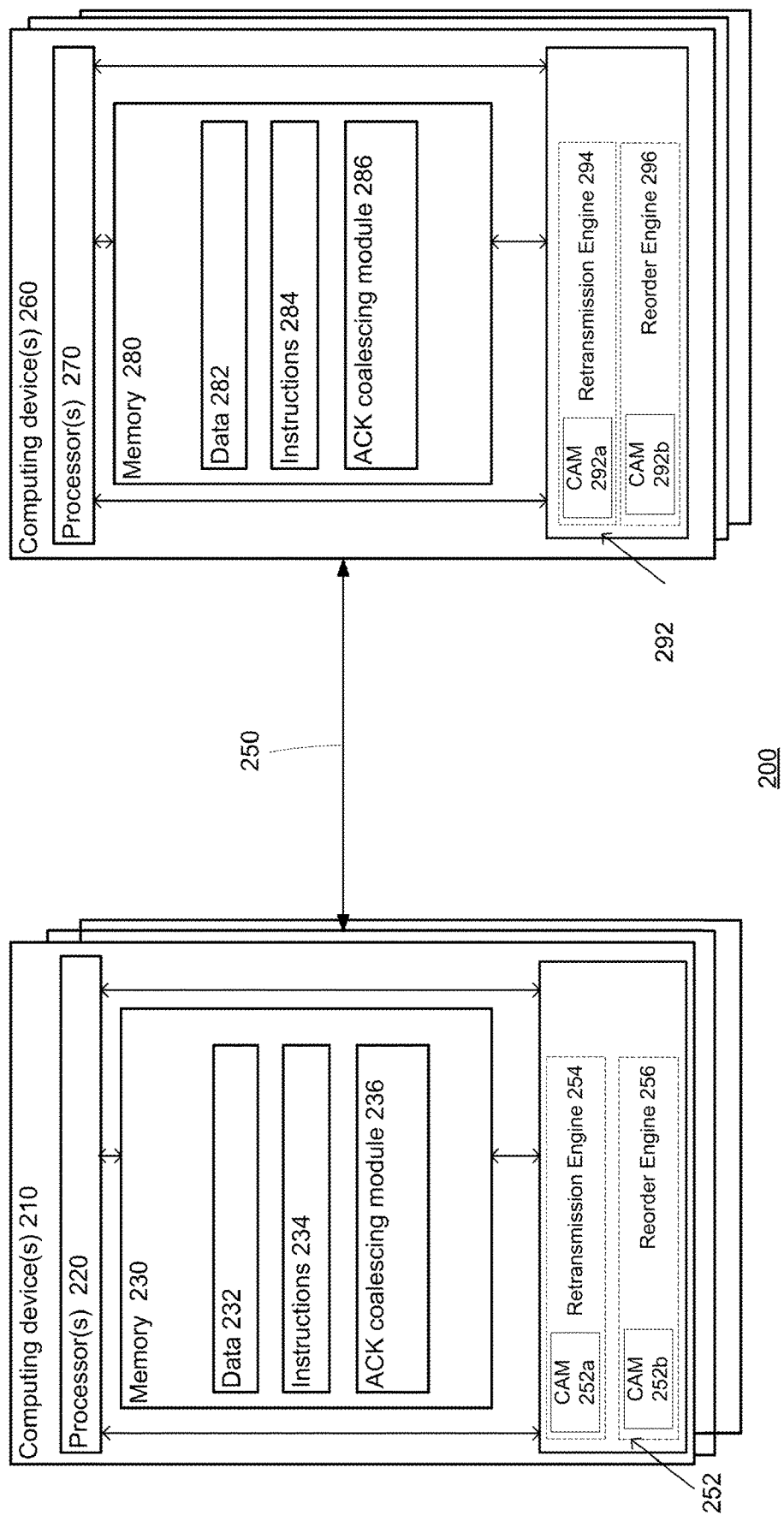
FIG. 2 is a block diagram of an example system according to aspects of the disclosure.

FIG. 2 is a block diagram of some components in an example system 200, such as a computing system, that can communicate using a reliable transport protocol. The system 200 includes at least two entities having one or more connections therebetween. It should not be considered as limiting the scope of the disclosure or usefulness of the features described herein. In this example, the system 200 is shown with two entities, one or more computing devices 210 and one or more computing devices 260, with a connection 250 therebetween. For example, the computing devices 210 may be entity A, such as an initiator entity or a sender entity, and the computing devices may be entity B, such as a target entity or a receiver entity of FIG. 1, and connection 250 may be connection 110 of FIG. 1. The computing devices 210 and 260 may be configured with similar components as shown or may include additional and/or different components. In the example shown, the computing devices 210 contain one or more processors 220 and memory 230 or a data storage device.

The one or more processors 220 can be any conventional processors, such as a commercially available CPU. Alternatively, the processors can be dedicated components such as an application specific integrated circuit ("ASIC") or other hardware-based processor. Although not necessary, the one or more of the computing devices 210 may include specialized hardware components to perform specific computing processes.

The memory 230, or the data storage device, can be of any non-transitory type capable of storing information accessible by the processor, such as a hard-drive, memory card, ROM, RAM, DVD, CD-ROM, write-capable, and read-only memories. Memory 230 of the computing devices 210 can store information accessible by the one or more processors 220, including data 232, instructions 234, and an acknowledgement coalescing module 236. The acknowledgement coalescing module 236, 286 may be installed in one or both of the computing devices 210, 260.

Memory 230 can include data 232 that can be retrieved, manipulated or stored by the processors 220. For example, data such as communication protocols, connection information, for example CIDs, definitions of headers, etc., as described with respect to FIG. 1 and FIG. 3-11 may be retrieved, manipulated, or stored by the processors 220.

Memory 230 of the computing devices 210 can also store instructions 234 that can be executed by the one or more processors 220. For example, instructions such as communication protocols as described with reference to FIGS. 1 and 3-10 may be performed by the one or more processors 220 according to instructions 234 and data 232 in memory 230.

Data 232 may be retrieved, stored, or modified by the one or more processors 220 in accordance with the instructions 234. For example, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The instructions 234 can be any set of instructions to be executed directly, such as machine code, or indirectly, such as scripts, by one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance.

The acknowledgement coalescing module 236 may be implemented in the memory 230 configured to perform an ACK coalescing operation. The ACK coalescing operation may pack, coalesce, or bundle multiple ACK packets and transmit the packed or coalesced ACK packets as one single transmission operation or with reduced numbers of transmission operations. Thus, the numbers of transmission for each ACK packet may be reduced as some ACK packets are coalesced in one transmission operation or piggybacked with other transmission operations. Thus, the overall transmission operations are reduced, thus enhancing the transmission efficiency and available network bandwidth. In one example, the acknowledgement coalescing module 236 provides certain settings, rules, or criteria that allow the one or more processors 220 from the computing devices 210 access thereto so as to coalesce multiple ACK packets and transmit the coalesced ACK packets in a reduced number of transmissions/operations.

A content addressable memory (CAM) 252, 292 (shown as 252a, 252b, 292a, 292b) may be installed in one or both of the computing devices 210, 260. The CAM 252, 292 may provide a look-up table that allows the processors 220, 270 to mark, order, classify, and identify the packets and data transmitted between the computing devices 210, 260 and store such information in the look-up table configured in the CAM 252, 292. In one example, the CAM 252, 292 is configured to be in communication with the acknowledgement coalescing module 236 so that the acknowledgement coalescing module 236 has the information regarding the numbers and the quantities of data packets so that the generated acknowledgment packets may be compared with the information of the data packets registered in the CAM 252, 292. With the communication between the content addressable memory (CAM) 252, 292 and the acknowledgement (ACK) coalescing module 236, 286, the acknowledgement coalescing module 236, 286 may provide associated guidelines and criteria so that when executed by the processors 220, 270, one or more of the acknowledgement packets may be coalesced based on the guidelines and criteria set in the acknowledgement coalescing module 236, 286. Thus, overall numbers of individual ACK packet to be transmitted in response to each of the data packets as received may be reduced.

In one example, the CAM 252, 292 may be configured and implemented in a retransmission engine 254, 294 and a reorder engine 256, 296 in the computing system. The CAM 252, 292 may be implemented in any suitable configurations in the computing devices 210, 250. The CAM 252, 292 may perform the look-up operation so as to compare the incoming and outgoing transmission packets and check the transmission state when data or packets are lost, out-of-order or missing during transmission. After the transaction of the data transmission is completed and the associated acknowledge packets are generated and received, the data entries in the look-up table may updated, installed or uninstalled based on the data transactions as performed and completed.

Based on the look-up table registered in the CAM 252, 292, data sequencing and transmission content may be easily stored and compared. Thus, when the packets are lost or out of order during transmission that requires reassemble, reorder, or retransmit, the CAM 252, 292 may assist identifying the missing or out-of-order information to request for data retransmission or data reordering. When identified, the data entries in the CAM 252, 292 may be required to be updated, installed or uninstalled. For example, when a data packet is requested to be retransmitted, the new packet being transmitted may include a new assigned sequence number. Thus, the data entries registered in the CAM 252, 292 may be required to be updated or installed. When a data transmission is completed, the data entries may be removed or uninstalled in the CAM 252, 292.

Although not shown, computing devices 210 may further include other components typically present in general purpose computing devices. For example, computing devices 210 may include output devices, such as displays (e.g., a monitor having a screen, a touch-screen, a projector, a television, or other device that is operable to display information), speakers, haptics, etc. The computing devices 210 may also include user input devices, such as a mouse, keyboard, touch-screen, microphones, sensors, etc.

Although FIG. 2 functionally illustrates the processor, memory, and other elements of computing devices 210 as being within the same block, the processor, computing device, or memory can actually comprise multiple processors, computers, computing devices, or memories that may or may not be stored within the same physical housing. For example, the memory can be a hard drive or other storage media located in housings different from that of the computing devices 210. Accordingly, references to a processor, computer, computing device, or memory will be understood to include references to a collection of processors, computers, computing devices, or memories that may or may not operate in parallel. For example, the computing devices 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 210 may be capable of directly and indirectly communicating with other entities, such as the computing devices 260, of a network through connection 250.

Computing devices 210 and 260 may be interconnected using various protocols and systems, such that computing devices in the network can be part of the Internet, World Wide Web, specific intranets, wide area networks, or local networks. Computing devices in the network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Figure 3:
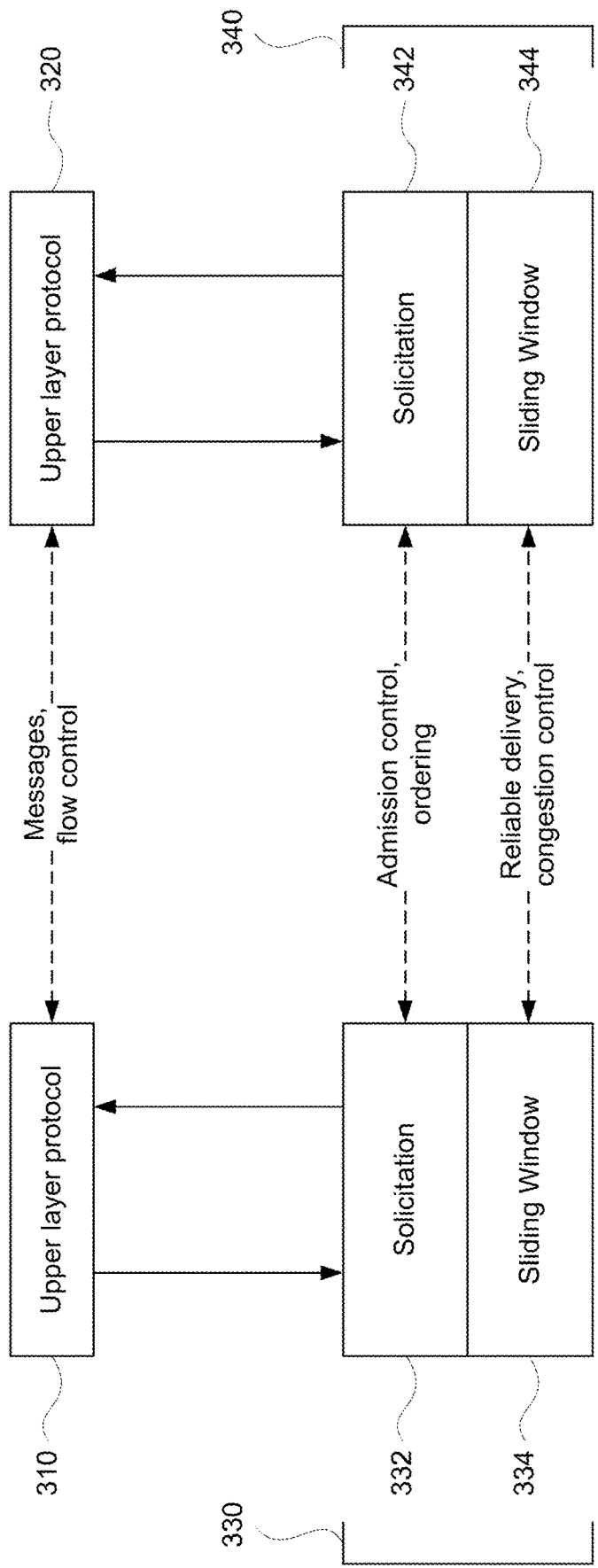
FIG. 3 is a block diagram of communication layers according to aspects of the disclosure.

Returning to FIG. 1, packets may be transmitted between the entities A, B, and/or C over the connections using one or more communication protocols. FIG. 3 shows an example communication protocol system 300. The communication protocol system 300 may be implemented on two or more entities in a network, such as two or more of entities A, B, C of network 100 of FIG. 1, for example by processors 220 and 270 of FIG. 2. As shown, each entity may include multiple layers of communication protocols. For example, entity A may include upper layer protocol ("ULP") 310 and reliable transport ("RT") protocol 330, and entity B may include ULP 320 and RT protocol layer 340. Peers may be formed between protocols of each layer. Thus, ULP 310 and ULP 320 are ULP peers, and RT protocol layer 330 and RT protocol layer 340 are RT peers. Further as shown, within each entity, the upper layer protocols are configured to communicate with the reliable transport protocols.

In one example, the ULPs 310, 320 may be responsible for implementing the hardware/software interface, processing of messages, completion notifications, and/or end-to-end flow control. The ULPs may be implemented on a number of hardware or software devices. For example, the ULPs may be implemented as Remote Direct Memory Access ("RDMA") operation. As another example, the ULPs may be implemented as a Non-Volatile Memory Express ("NVMe").

In one example, the RT protocols 330, 340 may be responsible for reliable delivery of packets, congestion control, admission control, and/or ordered or unordered delivery of packets. Each RT protocols 330, 340 may logically be partitioned into two sublayers of protocols. Thus, as shown, RT protocol layer 330 is partitioned into a solicitation sublayer 332 that is responsible for end-point admission control and optionally ordered delivery of packets, and a sliding window sublayer 334 that is responsible for end-to-end reliable delivery and congestion control. Likewise, RT protocol layer 340 is also divided into a solicitation sublayer 342 and a sliding window sublayer 344.

Figure 4:
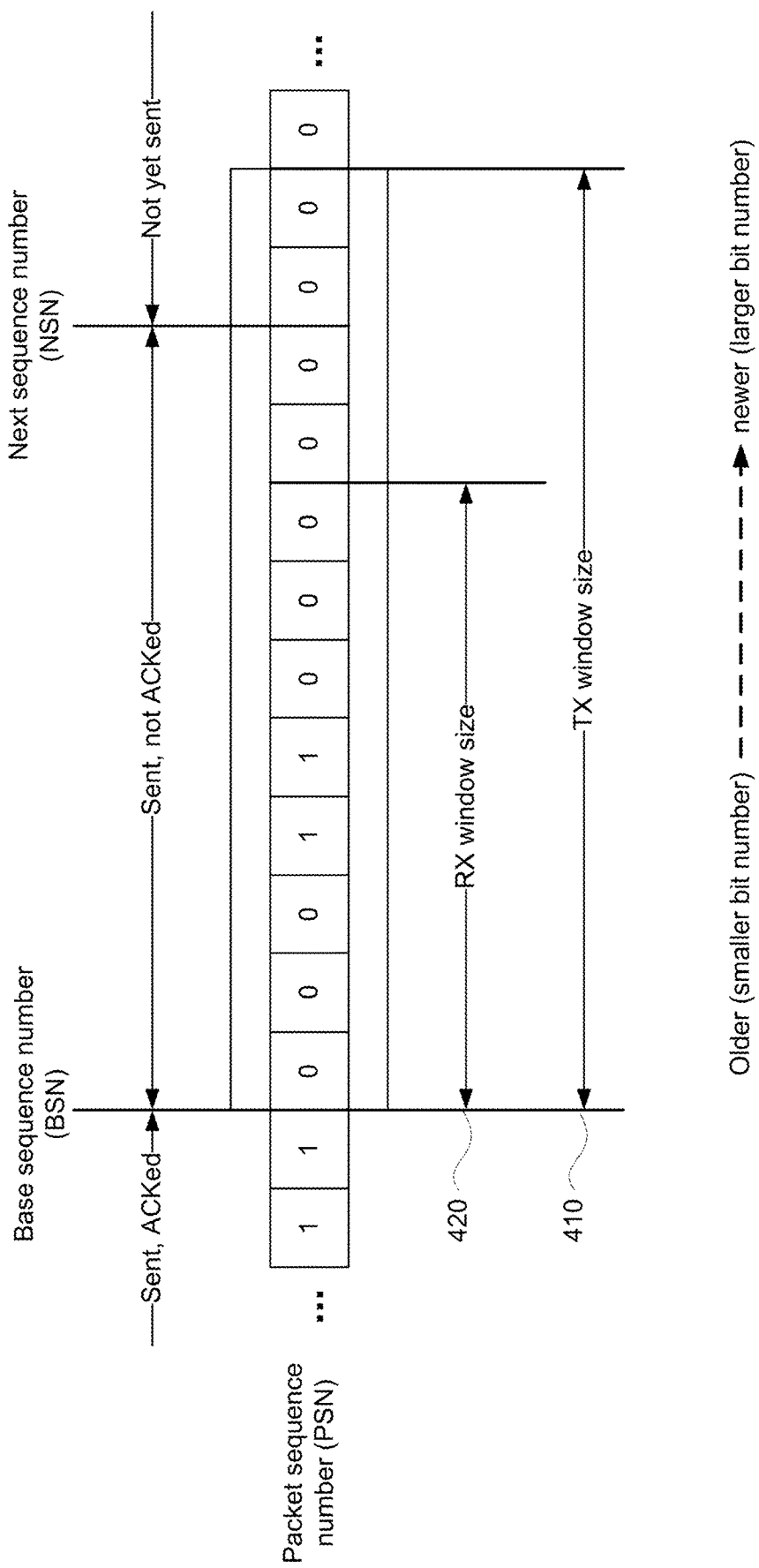
FIG. 4 illustrates an example sliding window according to aspects of the disclosure.

FIG. 4 shows example sliding windows 410 and 420 for data packet transmission control between a transmitter entity and a receiver entity. The sliding windows 410 and 420 are used by entities to keep track of a predetermined number of data packets to be transmitted and acknowledged at a predetermined time frame over a connection. For example, entity A may use the TX sliding window 410 for keeping track of packets sent to the entity B over the connection 110. Entity B may use the RX sliding window 420 for keeping track of packets received from entity B. In some examples, delays may occur between the TX sliding window 410 and RX sliding window 420 due to network latency. As a result, the TX sliding window 410 and RX sliding window 420 may go out-of-sync temporarily as a result of network delays or failures. As such, the sliding windows 410 and 420 may be respectively implemented in the sliding window sublayer 334 that is part of the RT protocol layer 330 of FIG. 3. The TX sliding window and the RX sliding window may have different sizes as shown, or may alternatively have the same size.

Referring to the TX sliding window 410, to keep track of the packets, each packet is assigned a Packet Sequence Number ("PSN") by an initiator entity. As shown, the bit number increases from left to right. The receiver entity may acknowledge the packets it has received within the sliding window by communicating to the initiator entity the PSN it has received within the window in an acknowledgement packet. In this regard, a Sequence Number Bitmap (SNB) may be provided on both the initiator entity and the receiver entity. Each bit of the Sequence Number Bitmap (SNB) represents one packet within a sliding window at the entity. For example, for the TX sliding window 410, a bit is set to 1 if a sent packet has been acknowledged. Otherwise, the bit is 0.

Once all packets within the TX sliding window 410 are received and acknowledged, the initiator entity may move the sliding window 410 forward to the next set of packets to be transmitted. The sliding window moves forward once the base sequence number (BSN) packet is acknowledged. Base Sequence Number (BSN) is the PSN value of the oldest packet that is yet to be acknowledged by the receiver entity. Thus, referring to the example in FIG. 4, the sliding window moves by one when the left most 0 is marked, and moves by another one when the second-left-most 0 is marked, and by three once the third 0 is marked (since the two following bits are already set).

PSN for the sender entity may include BSN and Next Sequence Number ("NSN"). As shown, NSN is the PSN value that should be assigned to the next packet transmitted over the connection to the receiver entity. For instance, when a packet is received from ULP 310 for transmission, the current PSN may be updated to NSN. Then when the packet is transmitted over the connection, NSN may be incremented, for example with NSN=(NSN+1) mod $2^{32}$. As such, within the sliding window 410, Bit 0 represents a PSN value of BSN and Bit n represents a PSN value of (BSN+n).

Although not shown, the receiver entity may also keep one or more sliding windows. For example, a RX sliding window may be kept by receiver entity B for the packets received, where each bit represents a packet to be received with the sliding window. The bit is set to 1 if the packet has been received by the receiver entity B. Otherwise, the bit is 0. The receiver entity B may also use PSN to keep track of received packets. For instance, BSN may be the PSN value of the oldest packet that is yet to be received by the receiver entity. When a packet is received with a PSN value of BSN, the BSN may be updated to the next lowest PSN of the packet that has not yet been received, for example with BSN=(BSN+1) mod $2^{32}$. The update of the BSN may clear the bits in the Sequence Number Bitmap corresponding to packets from the previous BSN to the PSN. As such, within the RX sliding window for the receiver entity B, Bit 0 represents a PSN value of BSN and Bit n represents a PSN value of (BSN+n). Because sender entity A does not acknowledge the acknowledgements sent by receiver entity B, that is, PSN is not used for the acknowledgment packets, the receiver entity B need not keep a TX sliding window for the acknowledgements it sends.

The sender entity and receiver entity may handle the packets and the respective acknowledgements according to a set of rules. For instance, if the receiver BSN in a received packet is smaller than the sender entity's BSN, the sender entity discards the ACK information; otherwise, the sender entity updates its BSN to match the receiver entity's BSN. After adjusting its BSN, the sender entity applies an OR operation on the receiver entity's Sequence Number Bitmap in the ACK packet with its own Sequence Number Bitmap. After a packet is transmitted, it is buffered by the sender entity until it is acknowledged by the receiver entity. With respect to retransmission of failed packets, the sender entity may be configured to free up resources allocated to all ACK packets in a retransmit buffer. Further, upon per packet retransmit timer expiry, the sender entity retransmits the packet with the same PSN as the original packet and increments a retransmission counter for that packet.

The receiver entity may also implement a number of rules. For instance, if the PSN value of the received packet is less than the BSN of the received packet, the receiver entity discards the packet and sends an ACK packet with the current BSN. If the PSN value falls within the receiver entity's sliding window, the receiver entity updates the Sequence Number Bitmap by setting the bit at location (PSN-BSN) to 1. If the bit at location (PSN-BSN) was already 1, the packet is discarded; otherwise the packet is delivered to the ULP of the receiver entity and a cumulative ACK counter is incremented. If the PSN of the received packet is equal to BSN of the received packet, the receiver entity updates the BSN to be equal to the next highest PSN that has not been received.

Note that, because the packets are tracked according to bitmaps, the sliding windows are configured to allow the entities to keep track of packets received and/or acknowledged out-of-order within the respective sliding window. Thus, as shown, although packets represented by bits 3 and 4 may be sent by entity A before the packets represented by bits 0, 1, and 2, the packets represented by bits 3 and 4 may be received and/or acknowledged before the packets represented by bits 0, 1, 2 in the TX sliding window 410.

Network congestion may be detected by monitoring packet retransmission and/or packet round-trip latencies. To perform congestion control, a size of the one or more sliding windows may be adjusted. For example, if congestion is high, it may take longer for all packets within the TX sliding window 410 to be received and/or acknowledged by entity B. As such, to reduce congestion, the number of outstanding packets in the network may be reduced by decreasing the size of the sliding window 410. Additionally or alternatively to changing the size of the sliding window, a retransmission timer expiry value may be adjusted in response to network congestion status. For example, retransmitting less frequently might reduce network congestion.

The communication protocol system 300 of FIG. 3 may support various transactions, including both pull and push transactions. The communication protocol system 300 of FIG. 3 may be configured to perform the transactions using an initiator-target approach, where an "initiator" is the entity that requests a transaction, and a "target" is the entity that responds to the request. Such a transaction may involve multiple packets to be transmitted between the initiator and target entities, thus the initiator and the target entities may be both sender and receiver of packets in the transaction and may keep track of packets and/or acknowledgements using TX and/or RX sliding windows as described with reference to FIG. 4.

Figure 5:
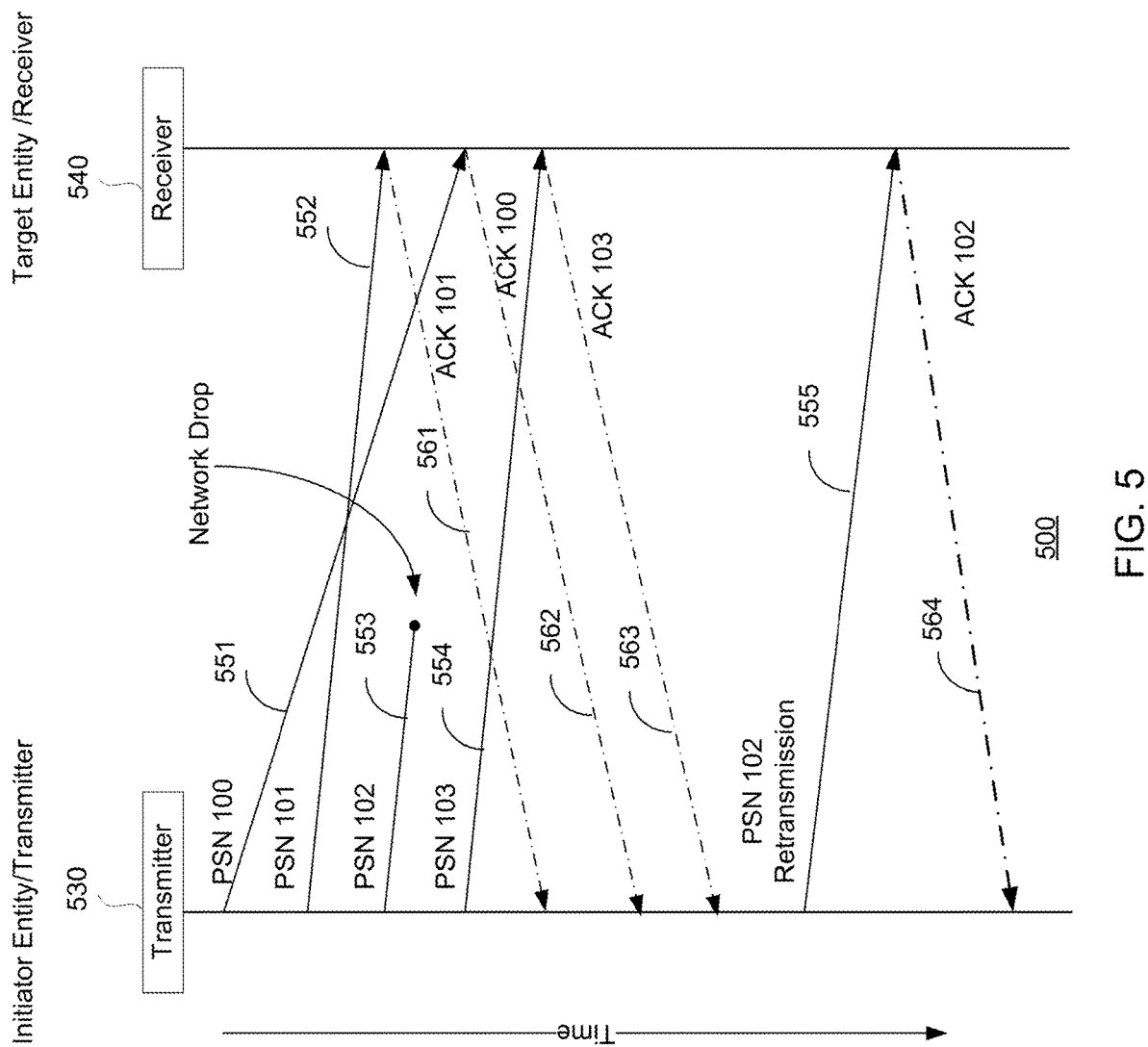
FIG. 5 is an example timing diagram of a data packet transmission according to aspects of the disclosure.

FIG. 5 shows an example timing diagram for a data packet transaction according to aspects of the technology. The example timing diagrams of FIG. 5 may be implemented by two entities in a network, such as entities A and B over connection 110 of FIG. 1.

In the example depicted in FIG. 5, the push requests may be initiated by an initiator entity 530, such as a transmitter or a sender, to be transmitted to a target entity 540, such as a receiver. As depicted in FIG. 5, each push request with an assigned packet serial number (PSN) 100-103 may originate from the initiator entity 530 to the target entity 540. The initiator entity 530 sends a request for sending one or more data packets to the target entity 540, for instance over the connection 110. Once the one or more data packets are received by the target entity 540, the target entity 540 may place or store the received data packet at the target entity 540. In response, the target entity 540 then sends an acknowledgment (ACK) packet, such as ACK 100-103 back to the initiator entity 530, acknowledging that the received data packets have been placed or stored according to the requests with the PSN 100-103. For reliable transport, the target entity 540 sends an ACK packet to notify the initiator entity 530 of the receipt and placement of the requested data packets, for instance over the connection 110. This is performed by the respective target entity 540. For example, as shown, the target entity 540 sends the ACK packets to the initiator entity 530.

In one example, the ACK packet includes a base sequence number (BSN) and sequence number bitmap (SNB). As described above with reference to FIG. 4, each bit is set to 1 if the data packet has been received. Otherwise, the bit is set as 0. Once the ACK packets with the corresponding BSN in response to the data packet are transmitted back to the initiator entity 530, the bitmap associated with recording transmission status of the acknowledgement packets is then updated.

In the example depicted in FIG. 5, a first data packet transmission, as shown by the communication path 551, with the assigned PSN 100 is transmitted to the target entity 540. Once the data packet is received and stored, the target entity 540 sends an acknowledgement packet ACK 100, as shown by the communication path 562, with the associated serial number to notify the initiator entity 530 that the first data packet is received and secured. In some situations, due to network connection delays or failure, the first data packet PSN 100 as transmitted may be received by the target entity 540 later than a second data packet PSN 101, as shown by the communication path 552, sent later than the first data packet PSN 100. Accordingly, an acknowledgement packet ACK 101, as shown by the communication path 561, may be generated and transmitted and received by the initiator entity 530 earlier than the acknowledgement packet ACK 100. Additional data packets PSN 103, as shown by the communication path 554, may be transmitted to the target entity 540 and a respective acknowledge packet ACK 103 with the associated serial number is then transmitted in return back to the initiator entity 530. In some examples wherein the network may be dropped, the data packet transmission PSN 102, as shown by the communication path 553, may not be able to be properly transmitted to the target entity 540. Thus, a retransmission, as shown by the communication path 555, may then be required to retransmit the missing data packet PSN 102.

It is noted that the data request transmission as depicted in FIG. 5 may include different types of the data transmission requests, such as solicited push requests, unsolicited push requests, pull requests or other different requests with different feedback mechanisms, such as pushGrants, pull responses, acknowledgement messages, or others.

Figure 6:
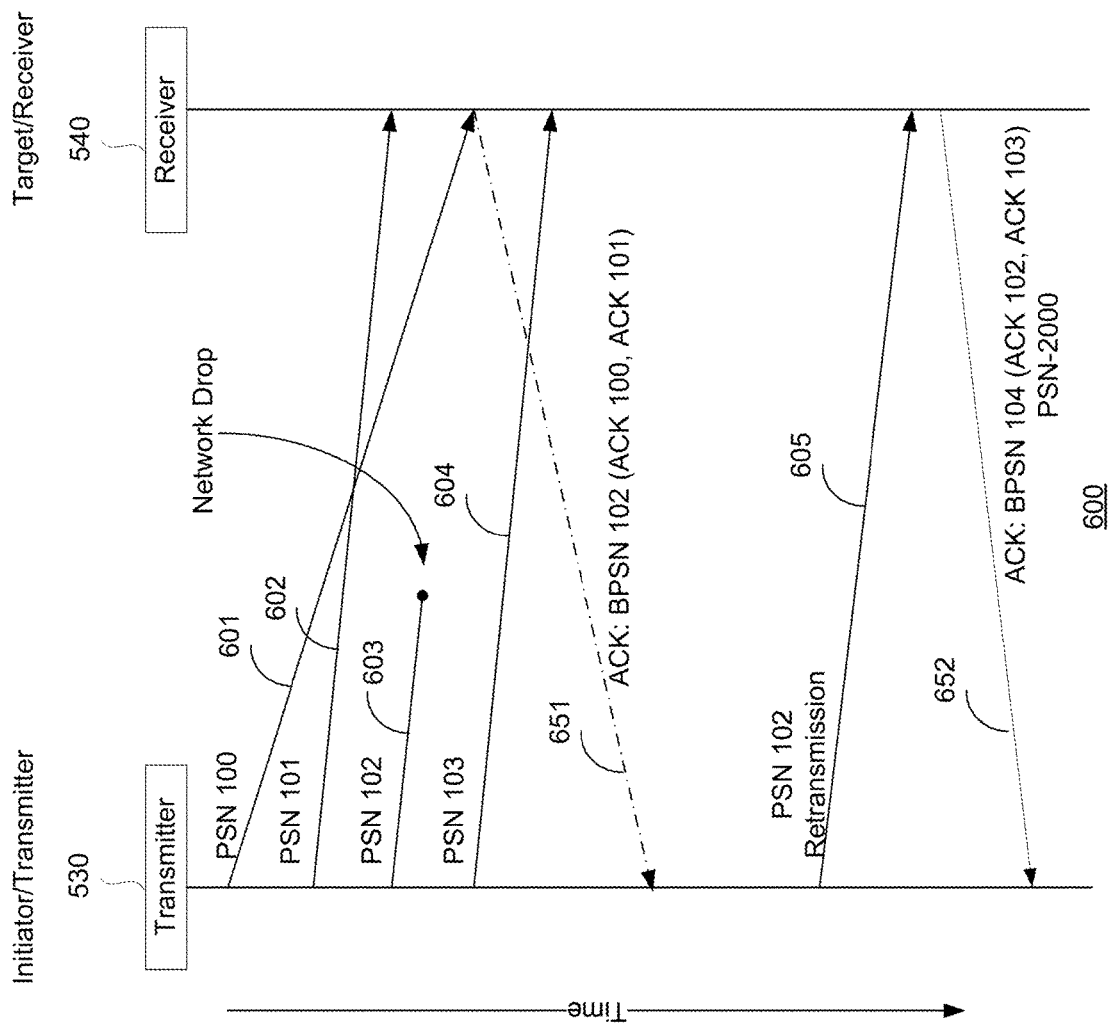
FIG. 6 is an example timing diagram of multiple data packet transmissions according to aspects of the disclosure.

FIG. 6 shows an example timing diagram 600 for multiple acknowledgement packets coalesced and consolidated in a reduced number of acknowledgement packet transmissions. Similar to the diagram depicted in FIG. 5, a first, second, third and fourth data packet PSN 100-103 with the assigned packet serial numbers (PSN) are transmitted from the initiator entity 530 to the target entity 540, as shown in the communication paths 601, 602, 603, 604. Unlike each individual transmission having a corresponding acknowledgement packet to be transmitted, in the example depicted in FIG. 6, the multiple acknowledgment packets may be coalesced and sent as one acknowledgement packet that includes information indicating the multiple acknowledgement packets were received. For example, instead of generating two individual ACK packets responding to the first and the second data packet PSN 100, PSN 101 respectively, a single coalesced acknowledgement packet ACK: BPSN 102, shown as the communication path 651, with multiple acknowledgement packets ACK 100, ACK 101 embedded therein may be transmitted. In this example, the coalesced acknowledgement packet ACK: BPSN 102 includes the acknowledgement packet ACK 100, ACK 101, indicating that the first and the second data packets PSN 100, PSN 101 are received by the target entity 540. As the third data packet PSN 102 was dropped during transmission, a retransmission of the third data packet PSN 102, as shown by the communication path 605, is performed to retransmit the third data packet PSN 102. Thus, the multiple acknowledgement packets, including the acknowledgement packet ACK 102 of the retransmitted third data packet PSN 102 and the acknowledgement packet ACK 103 of the fourth data packet PSN 103 are coalesced to be transmitted as a single acknowledgement packet ACK: BPSN 104. Furthermore, the information PSN 2000 of the older third data packet PSN 102 that was dropped and not received, such as the communication path 603, is also piggybacked in the reverse direction and coalesced with the acknowledgement packet ACK 102 of the retransmitted third data packet PSN 102 and the acknowledgement packet ACK 103 of the fourth data packet PSN 103, sending as a single acknowledge packet back to the initiator entity 530. By utilizing such piggyback mechanism to carry information of the previous unreceived data packet with other coalesced acknowledgement packet transmitted as a regular acknowledgement packet, the need to generate a new acknowledgement packet exclusively for indication of the unreceived data packet back to the initiator entity 530 may be eliminated. Thus, the total numbers of the acknowledgement to be transmitted back to the initiator entity 530 is reduced by coalescing and piggybacking acknowledgement packets, including the information for some data packets unreceived, thus enhancing the overall network transmission efficiency, performance and speed and lowering the likelihood of network congestion.

Figure 7:
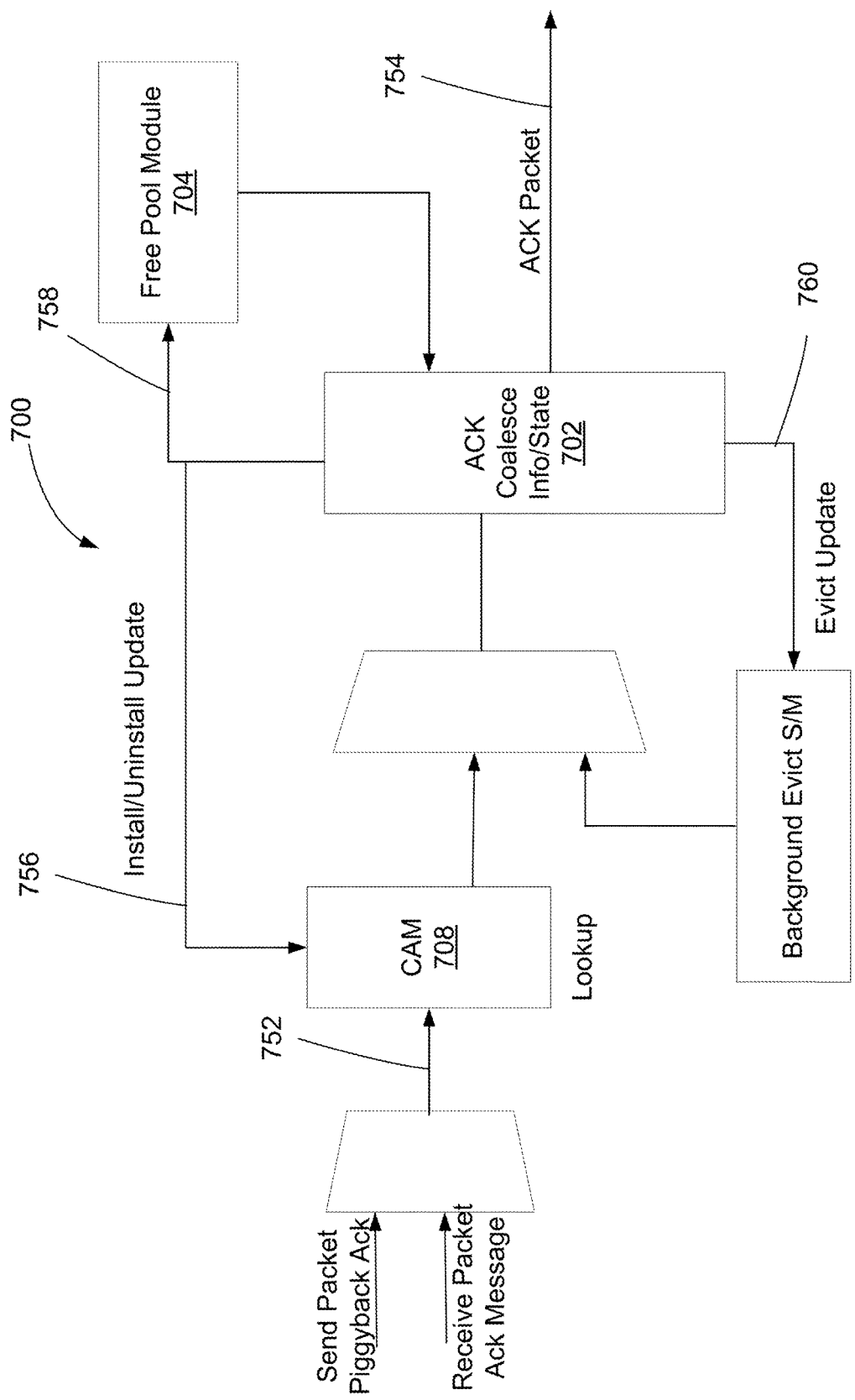
FIG. 7 is a schematic diagram illustrating operations and communications between an acknowledgement (ACK) coalescing module and a CAM in a computing system according to aspects of the disclosure.

FIG. 7 is a block diagram illustrating operations and communications between an acknowledgement (ACK) coalescing module 702 and a CAM 708 in a CAM-based hardware architecture 700 implemented in a computing system according to aspects of the disclosure. The content addressable memory (CAM) 708 provides a look-up table in communication with the acknowledgement coalescing module 702 to reduce total transmission of the acknowledge packets. It is noted that the CAM-based hardware architecture 700 may be built in the initiator entity 530 and/or target entity 540 to provide the lookup operation and acknowledgement coalescing operation. The CAM-based hardware architecture 700 may include one or more CAMs 708 that may provide look-up tables for data comparison and/or tracking for the acknowledge packets as received.

In one example, the acknowledgement (ACK) coalescing module 702 may accumulate acknowledgement packets for each connection. Thus, at least some acknowledge packets are coalesced and accumulated and may not be sent back to the initiator entity 530 until several criteria are met. Thus, the total transmission numbers of the acknowledge packet transmissions may be reduced to avoid excess numbers of acknowledgement packet transmissions, which may adversely result in network congestion or latency.

In one example, when an ACK packet, or a acknowledge message piggybacked with another acknowledgement packet transmission, is received, the connection ID (CID) which identifies the connection is looked up in the content addressable memory (CAM) 708, as shown by the communication path 752. If a match is found between the information from the received ACK packet and the data entries saved in the CAM 708, the received ACK packet in the connection may then be coalesced with the existing ACK packets to later be sent as a coalesced bundle with multiple ACK packets. In the meanwhile, the number of ACK packets as coalesced may be incremented by 1 in an ascending order. Thus, the acknowledgement (ACK) coalescing module 702 may keep track of the numbers of the ACK packets being coalesced in response to the ACK packet as received. In contrast, if a match is not found between the information from the received ACK packet and the data entries saved in the CAM 708, a new data entry is then needed to be allocated and installed in the CAM 708 for tracking of the missing transmission that was not previously recorded prior to transmission. The information of the received ACK packet is also updated in the CAM 708. When each cycle of the coalescing operation starts, timestamps of each received ACK packet are also marked by the acknowledgement coalescing module 702 to indicate the starting time point of the ACK coalescing window. The number of ACK packets coalesced is set to start at 1.

Referring back to FIG. 7, the received ACK packets are coalesced in the ACK coalescing module 702 based on the criteria set in the ACK coalescing module 702. Once a sufficient number of the ACK packets are coalesced and met the criteria set in the ACK coalescing module 702, the coalesced ACK packets may then be transmitted the coalesced ACK packets to the initiator entity 530, as indicated by the communication path 754, to complete the transaction. As the transaction is completed, the data entries may then be uninstalled in the CAM 708, as indicated by the communication path 756, deallocating the data entries and releasing such data entries to a free pool module 704, as shown by the communication path 758, for next use or tracking.

In some situations, eviction of the coalesced or individual ACK packets may occur to send the ACK packets to the initiator entity 530 collectively or individually under different circumstances. For example, the acknowledgement coalescing module 702 keeps track of the number of ACK packets which have been coalesced. When the number of ACK packets coalesced exceeds a programmable threshold, a coalesced ACK packet is sent out, such as evicting the coalesced ACK packet for transmission. The data entry being used for the connection is also freed up and released back in the free pool module 704 and the CAM entry is uninstalled in the CAM 708. The threshold ensures that for high bandwidth connections, the ACK packets are sent out at higher coalescing efficiency and reduces the total round-trip latency for the transaction completion. In this regard, the criteria for coalescing and evicting are based on the programmable threshold set in the acknowledgement coalescing module 702. In one example, the coalesced ACK packets may be evicted or transmitted when a predetermined programmed ACK packet count set in the acknowledgement coalescing module 702 is reached.

In another example of eviction, a data packet transmitted from initiator entity has the Acknowledgement Requested (AR) mark set, which indicates a request for an immediate ACK packet transmission upon receipt. The entire ACK packets is coalesced, including the last ACK packet with the AR mark, and sent out in an ACK packet. Similarly, the data entry is freed up in the free pool module 704 and the CAM entry being used for the CID is uninstalled in the CAM 708.

It is noted that other suitable eviction mechanism or criteria may also be implemented to efficiently coalesce and transmit ACK packets with low network congestion and latency.

Figure 8:
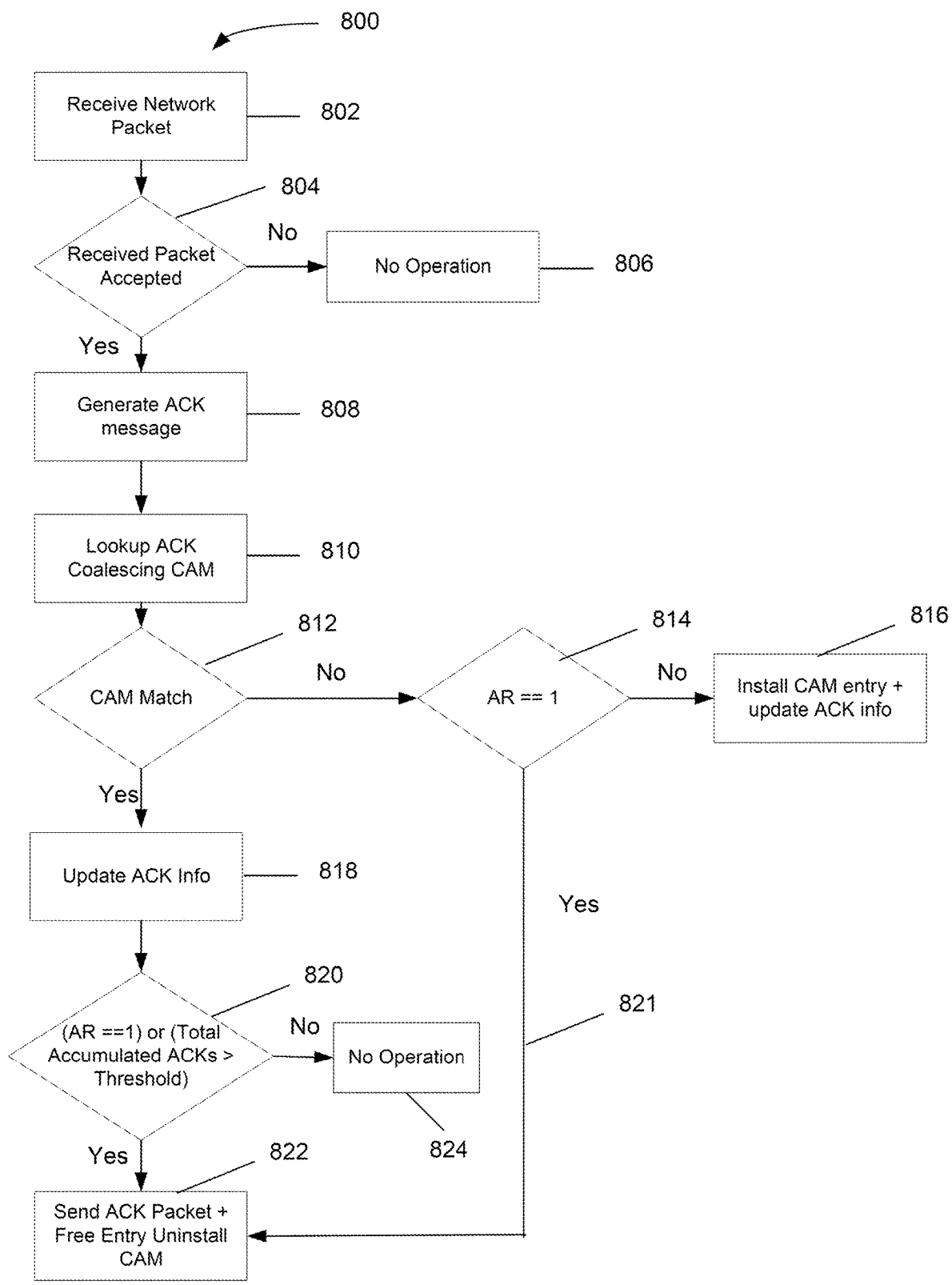
FIG. 8 is a flow diagram for an operation for coalescing acknowledgement packets according to aspects of the disclosure.

FIG. 8 depicts a flow chart of an operation 800 for an acknowledgement packet transmission according to aspects of the disclosure. The operation 800 starts at block 802 when a network packet, such as a transmission packet or a data packet, is received by a target entity. At block 804, when received, the target entity will determine whether to accept the network packet, such as whether to store or save the network packet or data packet in the target entity. When the network packet is received and stored in the target entity 540, at block 808, an acknowledgement packet is then generated. In contrast, if the network packet is not received, accepted, or placed by the target entity, no further operation will be conducted, as shown at block 806.

Returning back to block 808, after the acknowledge packet is generated, at block 810, the associated information of the acknowledge packets is looked up and compared with the data entries stored at a lookup table in the CAM. The associated information being looked up and compared between the acknowledgement packets and the data entries in the CAM are connection ID (CID), PSN, BSN, bitmap or the like. At block 812, once a match of the data entry in the CAM is found, the operation then proceeds to block 818 so that the information of the acknowledgement packet is updated in the ACK coalescing module 702, indicating the acknowledgement packet has a corresponding incoming data packet that was recorded in the data entries in the CAM so that acknowledgement packet is ready to be transmitted or coalesced based on the criteria set in the ACK coalescing module 702.

At block 820, the acknowledgement packet is then coalesced. The ACK packet as received is coalesced with the existing ACK messages until a pre-programed threshold of ACK coalescing count is reached. Once the ACK coalescing count is reached to the pre-programed threshold, the operation may then proceed to block 822, performing a transmission operation to send the coalesced acknowledge packet out to the initiator entity and the data entry may be uninstalled in the CAM and freed to the free data pool.

In contrast, when a match is not found at block 812, the operation may then proceed to block 814 instead. The timestamp may be marked to indicate the start of the ACK coalescing window and the number of ACK packets coalesced is set to 1, as shown at block 814. If further acknowledgement packets are received and the acknowledgement coalescing count is reached to the pre-programed threshold, the operation may then be proceeded to block 822, as indicated by the loop 821, to send the coalesced ACK packets back to the initiator entity to complete the transaction. However, if no associated info of the ACK packet can be set, the operation may then proceed to block 816 and a new data entry may be needed to be set in the CAM to establish the missing information of the acknowledgement packet.

Figure 9:
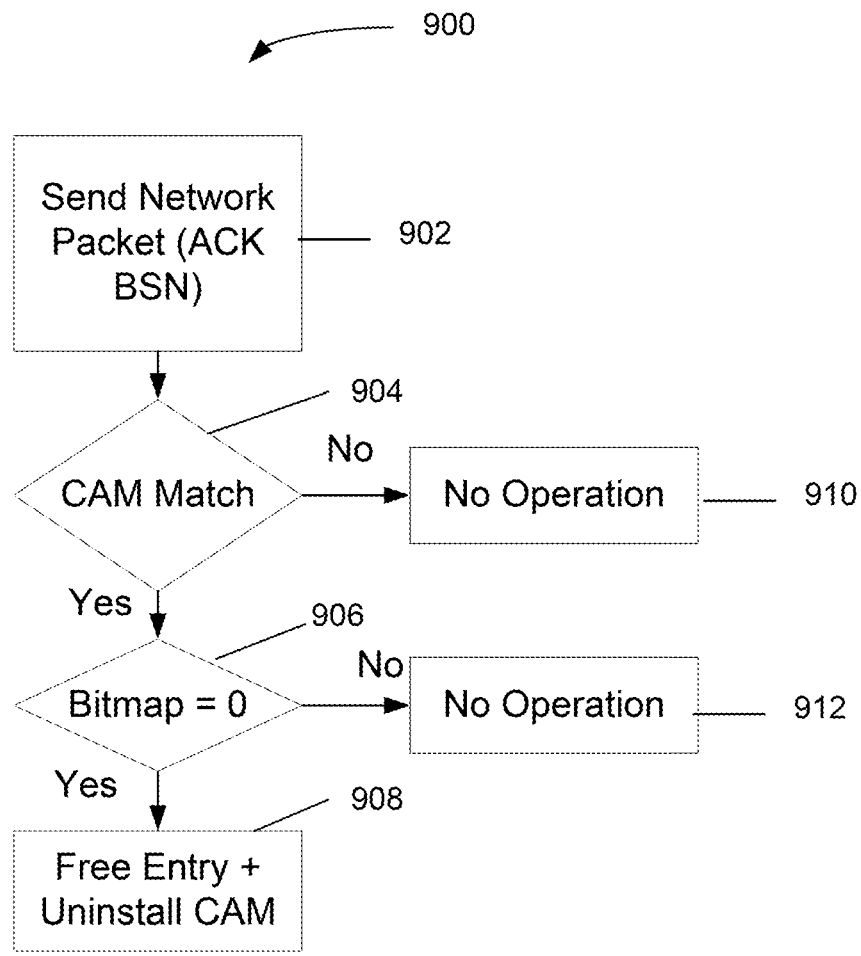
FIG. 9 is a flow diagram for an example operation for a piggyback based eviction mechanism according to aspects of the disclosure.

FIG. 9 depicts an example operation for the piggyback based eviction mechanism according to aspects of the disclosure. The operation 900 starts at block 902, a network packet, such as an acknowledge BSN, is transmitted back to the initiator entity, indicating one or more earlier transmissions are unreceived. The ACK BSN carries the protocol header which provides information to the packet initiator of the earlier packet that has not been received. It is noted that the transmission of such ACK BSN may be piggybacked with other transmission including the coalesced one or more acknowledgement packets to reduce transmission bandwidth. At block 904, such information is then compared with the data entries stored and registered in the CAM. When no match is found, the operation may then proceed to block 910 so that no further operation is needed. In contrast, if a match is found, the operation may proceed to block 906 to check the status of the bitmap as recorded. If the ACK bitmap does not have a bit set, such as the bit set as 0, indicating no acknowledge packet is yet received. Thus, the operation may proceed to block 908 to evict and uninstall the data entry in the CAM. For bidirectional traffic, the ACK coalescing efficiency would be higher due to piggyback BSN and overall reduced ACK packet transmissions.

Figure 10:
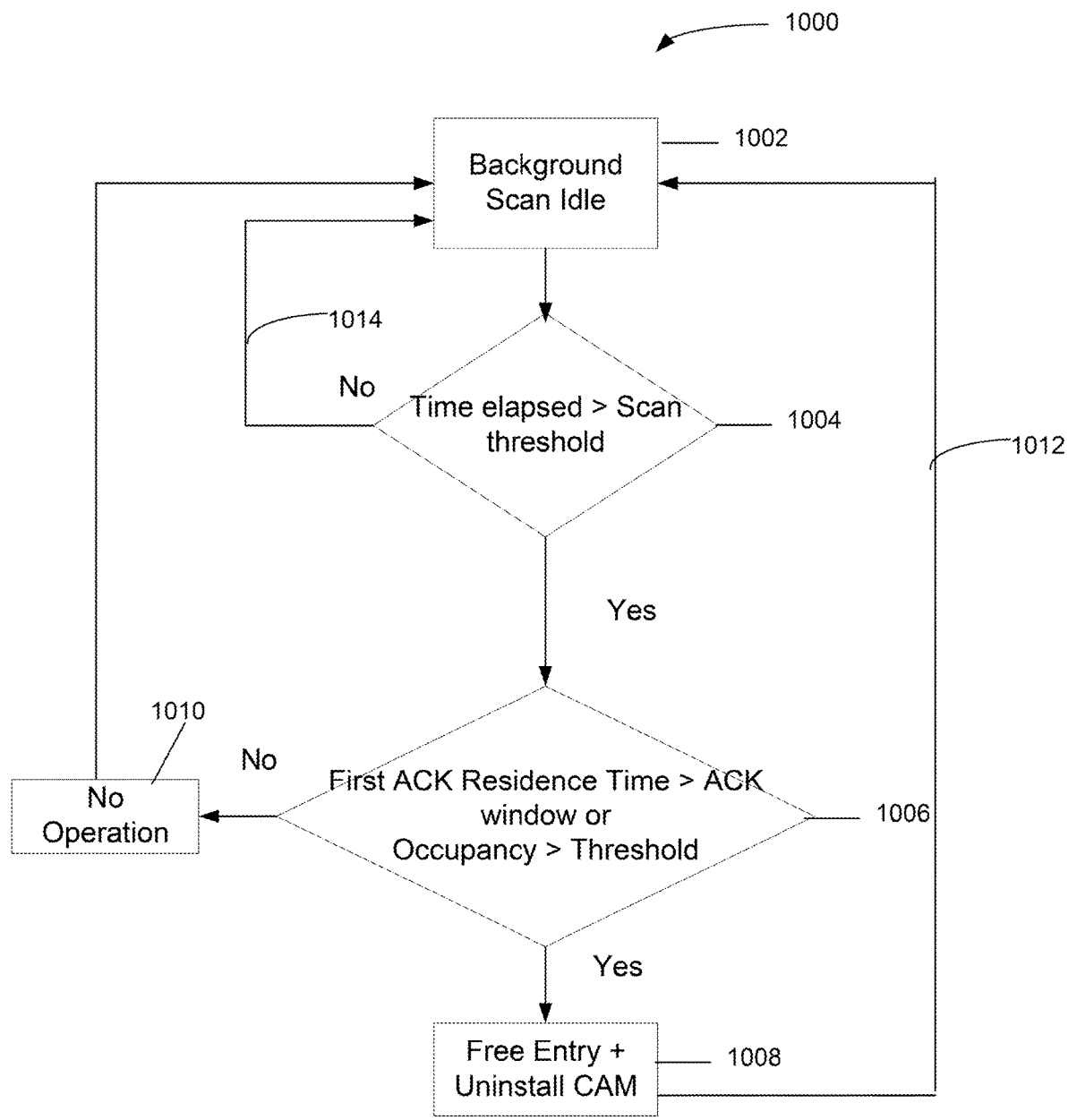
FIG. 10 is a flow diagram for another example operation for a time-based eviction mechanism according to aspects of the disclosure.

FIG. 10 depicts an example operation for a time-based eviction mechanism of data entries in a CAM according to aspects of the disclosure. The ACK coalescing module 702 is also configured to include the time-based eviction mechanism to evict ACK packets which have been occupied or idle in the ACK coalescing module 702 beyond a programmable ACK coalescing window threshold. The time-based eviction operation 1000 starts at block 1002 by performing a background scan on the active entries for the earliest install time of the acknowledgement packet in the ACK coalescing module. At block 1004, if an entry has been occupied or idle in the ACK coalescing module 702 beyond a predetermined time threshold, an ACK packet is sent out, as shown in block 1006, so that the entry is freed up and the CAM entry is uninstalled, as shown in block 1008. The coalescing window provides an upper limit on the amount of time that the ACK coalescing module 702 could retain an ACK packet.

Furthermore, in another example, a data entry may also be evicted based on the total number of connections being coalesced. When the ACK coalescing module 702 has many actively coalesced connections and the number of free entries in the free pool module 704 available is low, the almost full occupancy may trigger eviction for the earlier entries. The programmable occupancy threshold compares the total active entries and evicts entries which have the largest occupying time and/or idle time. Thus, a desired amount of the data entry availability may be controlled and maintained in the CAM.

Figure 11:
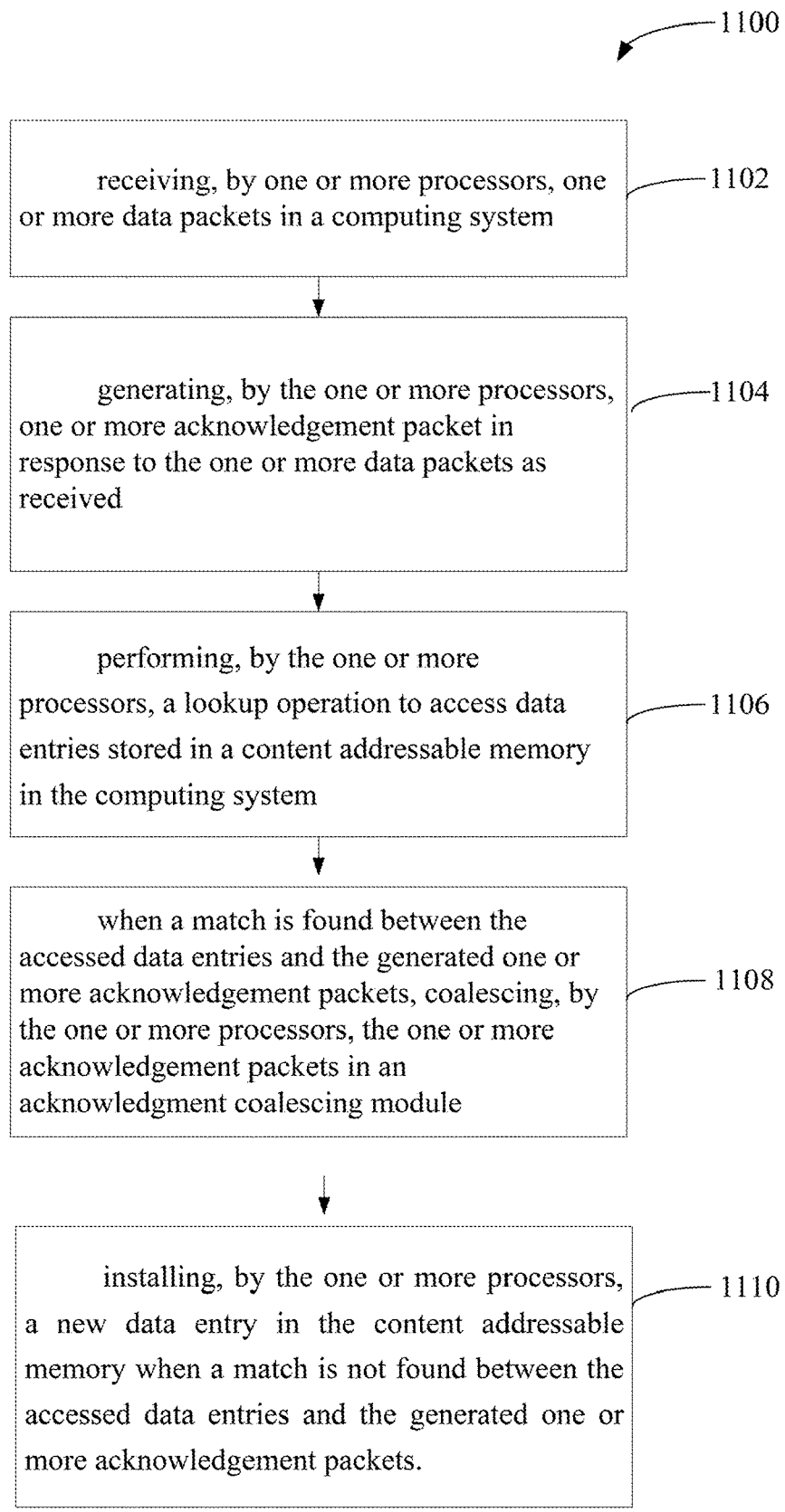
FIG. 11 is an example flow diagram according to aspects of the disclosure.

FIG. 11 depicts a flow chart for performing an acknowledgement packet coalescing operation in a CAM based architecture system. The method may be performed using the CAM based architecture system described above, modifications thereof, or any of a variety of systems having different configurations. It should be understood that the operations involved in the following methods need not be performed in the precise order described. Rather, various operations may be handled in a different order or simultaneously, and operations may be added or omitted. Although FIG. 11 illustrates one example method, variations of the methods may be performed, for instance as described above with reference to FIG. 1-10.

Referring to FIG. 11, the operation starts at block 1102, one or more data packets may be received by one or more processors in a computing system. In one example, the data packets may be received by a receiver entity or a target entity.

In block 1104, one or more acknowledge packets is generated by the one or more processors in response to the one or more data packets as received.

In block 1106, a lookup operation is then performed by the one or more processors to access data entries registered in a content addressable memory in the computing system. The lookup operation compares the information from the one or more acknowledge packets with the data entries registered in the content addressable memory.

In block 1108, after comparison, when a match is found between the accessed data entries in the CAM and the generated one or more acknowledgement packets, the one or more acknowledgement packets may then be coalesced in an acknowledgment coalescing module. After the coalesced acknowledgement packets are transmitted, the data entries in the CAM may then be uninstalled and released back to the free pool for future use.

Optionally, in block 1110, in contrast, if a match is not found between the accessed data entries and the generated one or more acknowledgement packets, a new data entry may then be installed by the one or more processors.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computing system, comprising:
a content addressable memory;
a data storage device;
an acknowledgment coalescing module configured in the data storage device configured to be in communication with the content addressable memory; and
one or more processors in communication with the content addressable memory and the acknowledgment coalescing module, the one or more processors configured to:
receive one or more data packets;
generate one or more acknowledgement packets in response to receiving the one or more data packets;
perform a lookup operation to access data entries stored in the content addressable memory; and when a match is found between the accessed data entries and the generated one or more acknowledgement packets, coalesce the one or more acknowledgement packets in the acknowledgment coalescing module.

2. The computing system of claim 1, wherein the one or more processors are further configured to:
when a match is not found between the accessed data entries and the generated one or more acknowledgement packets, install a new data entry in the content addressable memory.

3. The computing system of claim 1, wherein the one or more processors are further configured to:
evict the coalesced acknowledgement packets as a single acknowledgment packet when a pre-programmed threshold of acknowledgement packet count is reached.

4. The computing system of claim 1, wherein the one or more processors are further configured to:
piggyback an acknowledgment message in the one or more acknowledgment packets.

5. The computing system of claim 3, wherein the one or more processors are further configured to:
uninstall the data entries in the content addressable memory after the coalesced acknowledgement packets are evicted.

6. The computing system of claim 1, wherein the one or more processors are further configured to:
evict the one or more acknowledgement packets immediately when occupancy of the data storage device reaches a pre-programmed threshold.

7. The computing system of claim 1, wherein the one or more processors are further configured to:
perform a background scan in the acknowledgment coalescing module; and
evict the one or more acknowledgement packets when a pre-programmed threshold of acknowledgement coalescing time is reached.

8. The computing system of claim 1, wherein the lookup operation further causes the one or more processors to:
look up a connection ID in the data entries in the content addressable memory related to the one or more acknowledgement packets.

9. The computing system of claim 1, wherein the one or more acknowledgement packets comprises information of a base sequence number and a sequence number bitmap.

10. A method, comprising:
receiving, by one or more processors, one or more data packets in a computing system;
generating, by the one or more processors, one or more acknowledgement packets in response to the one or more data packets;
performing, by the one or more processors, a lookup operation to access data entries stored in a content addressable memory in the computing system; and
when a match is found between the accessed data entries and the generated one or more acknowledgement packets, coalescing the one or more acknowledgement packets in an acknowledgment coalescing module.

11. The method of claim 10, further comprising:
installing, by one or more processors, a new data entry in the content addressable memory when a match is not found between the accessed data entries and the generated one or more acknowledgement packets.

12. The method of claim 10, further comprising:
evicting, by one or more processors, the coalesced acknowledgement packets as a single acknowledgment packet when a pre-programmed threshold of acknowledgement packet count is reached.

13. The method of claim 12, wherein evicting the coalesced acknowledgement packets as the single acknowledgment packet further comprises:
piggybacking, by the one or more processors, an acknowledgment message in the one or more acknowledgment packets.

14. The method of claim 10, further comprising:
evicting, by the one or more processors, the one or more acknowledgement packets immediately when the one or more data packets includes an acknowledgment requested mark set therein.

15. The method of claim 12, further comprising:
uninstalling, by the one or more processors, the data entries in the content addressable memory after the coalesced acknowledgement packets are evicted.

16. The method of claim 10, further comprising:
performing a background scan, by the one or more processors, in the acknowledgment coalescing module; and
evicting, by the one or more processors, the one or more acknowledgement packets when a pre-programmed threshold of acknowledgement coalescing time is reached.

17. The method of claim 10, wherein the lookup operation comprises:
looking up, by the one or more processors, a connection ID or packet sequence number in the data entries in the content addressable memory related to the one or more acknowledgement packets.

18. The method of claim 10, wherein the one or more acknowledgement packets comprises information of a base sequence number and a sequence number bitmap.

19. The method of claim 11, wherein the computing system is configured to perform a remote direct memory access operation.

20. A method, comprising:
coalescing, by one or more processors, multiple acknowledgement packets to generate a single coalesced acknowledgement packet in an acknowledgment coalescing module implemented in a computing system, the acknowledgment coalescing module communicating with a content addressable memory storing data entries;
evicting the single coalesced acknowledgement packet to an initiator entity in the computing system; and
uninstalling the data entries in the content addressable memory after the coalesced acknowledgment packet is evicted.

* * * * *